(12) United States Patent
Jordan et al.

(10) Patent No.: US 7,973,948 B2
(45) Date of Patent: Jul. 5, 2011

(54) MULTIFUNCTION OFFICE DEVICE ENABLING INPUT SCANNING BEFORE ENTERING MACHINE INSTRUCTIONS

(75) Inventors: Andrew Jordan, Harpenden (GB); Thomas E. Chase, Welwyn Garden (GB); Satyan Vadher, Middlesex (GB); Ian C. Hamilton, Letchworth Garden (GB)

(73) Assignee: Xerox Corporation, Norwalk, CT (US)

( * ) Notice: Subject to any disclaimer, the term of this patent is extended or adjusted under 35 U.S.C. 154(b) by 1515 days.

(21) Appl. No.: 11/289,009

(22) Filed: Nov. 29, 2005

(65) Prior Publication Data

US 2007/0121159 A1    May 31, 2007

(51) Int. Cl.
*G06F 3/12* (2006.01)
(52) U.S. Cl. ............... 358/1.13; 358/1.15; 358/1.18; 358/474; 358/468
(58) Field of Classification Search ........... 358/1.1–1.16
See application file for complete search history.

(56) References Cited

U.S. PATENT DOCUMENTS

| | | | | |
|---|---|---|---|---|
| 5,579,087 A | * | 11/1996 | Salgado | 358/296 |
| 5,748,335 A | * | 5/1998 | Honma et al. | 358/445 |
| 5,969,826 A | * | 10/1999 | Dash et al. | 358/400 |
| 2002/0069234 A1 | * | 6/2002 | McIntyre | 709/104 |
| 2006/0250659 A1 | * | 11/2006 | Contino | 358/296 |

FOREIGN PATENT DOCUMENTS

| | | |
|---|---|---|
| JP | 2000-156752 | 6/2000 |
| JP | 2002-354176 | 12/2002 |
| JP | 2003-304358 | 10/2003 |

OTHER PUBLICATIONS

Hewlett-Packard Development Company, hp 9085mfp System Administrator Guide, Published Oct. 2003, First available online Feb. 26, 2004.*
Japanese Office Action dated Feb. 8, 2011, in Connection With Related Japanese Application No. 2006-319377.

* cited by examiner

*Primary Examiner* — Benny Q. Tieu
*Assistant Examiner* — Michael Tzeng
(74) *Attorney, Agent, or Firm* — Ronald E. Prass, Jr.; Prass LLP

(57) ABSTRACT

In operating a multifunction office apparatus, the apparatus including a user interface, an input scanner, and at least one of a printer, finisher, disc recorder, facsimile transmitter, network transmitter, or electronic mail transmitter, images from a document are recorded as image data in a memory. Simultaneous with the recording, instructions are accepted through the user interface for applying the image data to the multifunction office apparatus.

14 Claims, 4 Drawing Sheets

MULTIFUNCTION OFFICE DEVICE
ENABLING INPUT SCANNING BEFORE
ENTERING MACHINE INSTRUCTIONS

TECHNICAL FIELD

The present disclosure relates to multifunction office equipment, such as digital copiers, having, for instance, additional printing, facsimile, and electronic mail capabilities.

BACKGROUND

In the office equipment industry, particularly in regard to what are generally called "copiers," much effort is directed to enabling a human user to communicate to the machine the actions that are desired. Even in the basic copying context, a human user will have to enter such information as what size original documents are being loaded, what size output sheets are desired, whether transparencies are desired, whether the copies are to be one- or two-sided, how many copies are desired, how are the copies to be stapled, are the images to be changed in size, etc. Various schemes have been proposed over the years for presenting possible selections to a human user, usually through a changeable display such as a touch-screen, in a convenient and intuitive way. A patent giving an overview of "user interfaces" in a copier is U.S. Pat. No. 5,159,546.

In recent years the basic office copier has evolved into what can be called a "multi-function device" or MFD. With digital technology, a machine with the basic outward appearance of a traditional copier can perform additional functions such as printing documents submitted in digital form over a network; sending and receiving messages via facsimile; recording hard-copy original images in digital form and sending the resulting data over a network, such as in electronic mail; or recording hard-copy original images in digital form on a compact disc or equivalent medium. These additional functions present further challenges to a designer of a convenient and intuitive user interface.

When a human user approaches a digital copier or MFD, there are two basic actions: a document of hard-copy image-bearing sheets is loaded into the machine, and the user interacts with a series of screens at the user interface (UI) to communicate to the MFD the desired actions. Typically, the entry of selections into the UI consumes a significant amount of time, and is prone to mistakes and changes of mind on the part of the human user. Typically, the recording of the images on the original sheets cannot begin until the control system of the machine has been instructed through the UI.

SUMMARY

According to one embodiment, there is provided a method of operating a multifunction office apparatus, the apparatus including a user interface, an input scanner, and at least one of a printer, finisher, disc recorder, facsimile transmitter, network transmitter, or electronic mail transmitter. Images from a document are recorded as image data in a memory. During or after the recording, instructions are accepted through the user interface for applying the image data to the printer, finisher, disc recorder, facsimile transmitter, network transmitter, or electronic mail transmitter.

DETAILED DESCRIPTION

Figure 1:
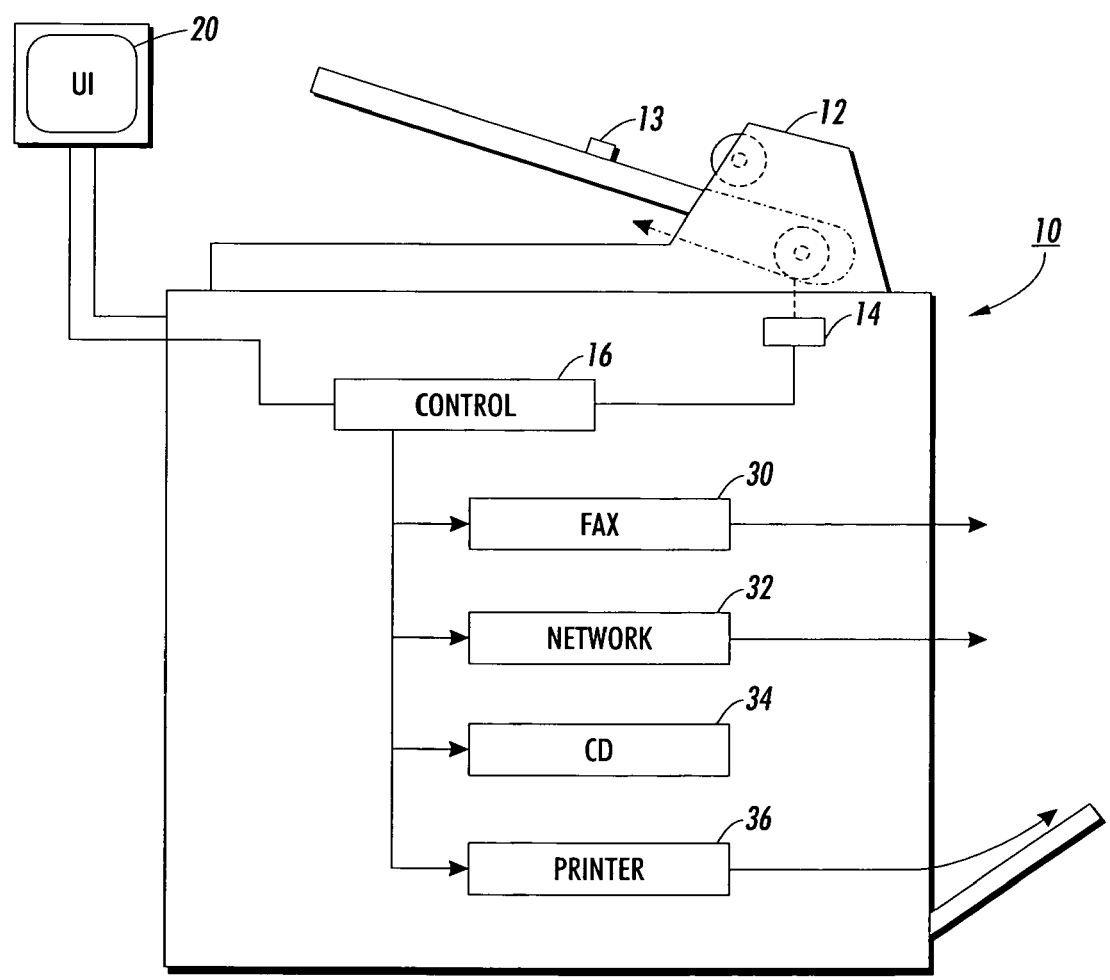
FIG. 1 is a simplified diagram of a multifunction device (MFD).

FIG. 1 is a simplified diagram of a multifunction device (MFD) generally indicated as 10. The MFD 10 includes and input scanner, typically including a document handler 12 and a photosensitive image recorder 14. The image recorder 14 usually includes one or more photosensitive chips for recording the images, in a series of small areas, on the image-bearing sheets passing through image handler 12. In many common designs of MFD, the document handler 12 can be lifted up to expose a flat platen for the exposure of stationary image-bearing sheets. As used herein, any original image-bearing sheets conceived singly or as a set shall be considered a "document." The image data recorded by image recorder 14 is retained in a memory associated with a controller 16.

Another input to controller 16 is a user interface or UI, 20. Typically, but not necessarily, the UI 20 includes a touch-screen or equivalent (such as a display with associated "hard" buttons) through which predetermined "selections" are displayed to the human user for selection. As described generally in the '546 patent cited above, the making of certain selections will cause the subsequent display of predetermined screens with further detailed selections: e.g., if a user selects "copy" on the first screen, a next screen to be displayed with provide selections immediately relevant to the copying process, such as relating to number of copies, stapling, or enlargement.

Also shown in FIG. 1, associated with controller 16 of MFD 10, are boxes indicating the various general functions that are common in MFD's. For instance, an image recorded at controller 16 can be transmitted as a facsimile, such as through facsimile transceiver 30; when facsimile functions are used, a destination fax number must be entered or otherwise indicated through UI 20. The recorded image data can also be sent to a destination computer on a network through a network communication board 32; such a system can rely on electronic mail communication or some other network protocol. When such a system as 32 is used, information about the destination of the data is typically entered on UI 14. It is also possible to record the image data onto a digital data medium such as a compact disk (CD), such as shown by CD burner 34. (In the language of the claims, it will be understood that the phrase "disc recorder" includes any recording technology, including CD's, tape drives, USB devices, smart cards, and any other technology for retaining digital data that will be invented or become popular in the future.) The use of such a device is directed by instructions entered through UI 14. Finally, a digital copier includes a print engine 36, along with ancillary software and finishers such as staplers (not shown), which would output copies based on the image data recorded by image recorder 14. In a copier mode, various inputs about image zoom, two-sided printing, stapling, number of copies, etc., are entered through UI 14. As used herein, any data relating to how the image data recorded by image recorder 14 is to be handled or processed shall be considered "instructions".

In the present disclosure, the entry of instructions through the UI 20 for a particular document occur during or after the recording of the original images by image recorder 14. In other words, in a practical embodiment, a user places the image-bearing sheets of the original document in document handler 12, where the sheets are essentially instantly fed through the document handler 12 and recorded by image recorder 14, and then, possibly during the image recording, the UI 20 displays selections that can be made by the user with regard to the processing of the document, whether for copying, facsimile, or other purpose. Only after the user indicates through the UI 20 that the instructions are concluded are the substance of the instructions applied to the recorded image data. When the entry of instructions and the scanning are concluded, the entered instructions are applied to the input image data. As a practical matter, particularly with an original document of a few pages, the entry of instructions could occur after the scanning is complete.

Figure 2:
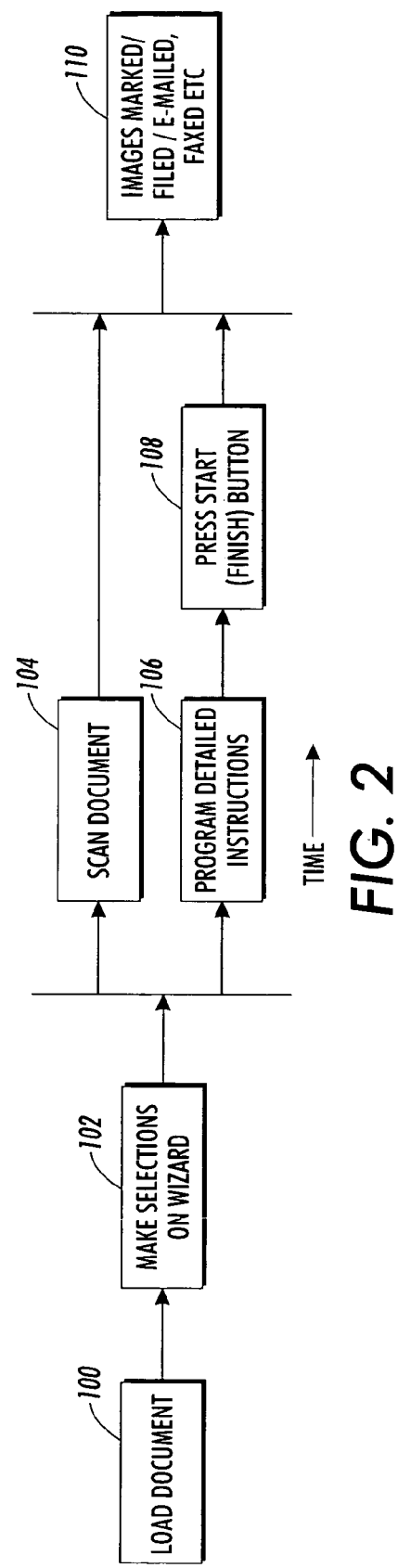
FIG. 2 is a diagram of the operation of an MFD according to one embodiment.

FIG. 2 is a diagram of the operation of a MFD 10 according to one embodiment. The human user loads a document into document handler 12 (as shown in FIG. 1); a mechanical or optical detector such as 13 in FIG. 1 detects the loading of sheets (as well as the size of the sheets) in the document handler 12, as shown by step 100 in FIG. 2. The UI 14 displays and accepts selections (step 102) on what can be called a "wizard" screen, which will be described in detail below. Once a basic selection is made on the wizard screen, two processes occur simultaneously: the document is scanned by document handler 12 and image recorder 14 (step 104), and detailed instructions are accepted by subsequently-displayed screens on UI 20 (step 106). The subsequently-displayed screens are caused to be displayed depending on the basic selection (copy, fax, etc.) entered by the user on the wizard screen.

Once a set of instructions have been accepted through the UI 20 with regard to the document being recorded, the human user enters, and the UI 20 accepts, an instruction that the submission of instructions has been concluded (step 108). When both the instruction entry and scanning of the document are completed, the instruction set entered and accepted through UI 20 is applied is the recorded image data (step 110).

Figure 3:
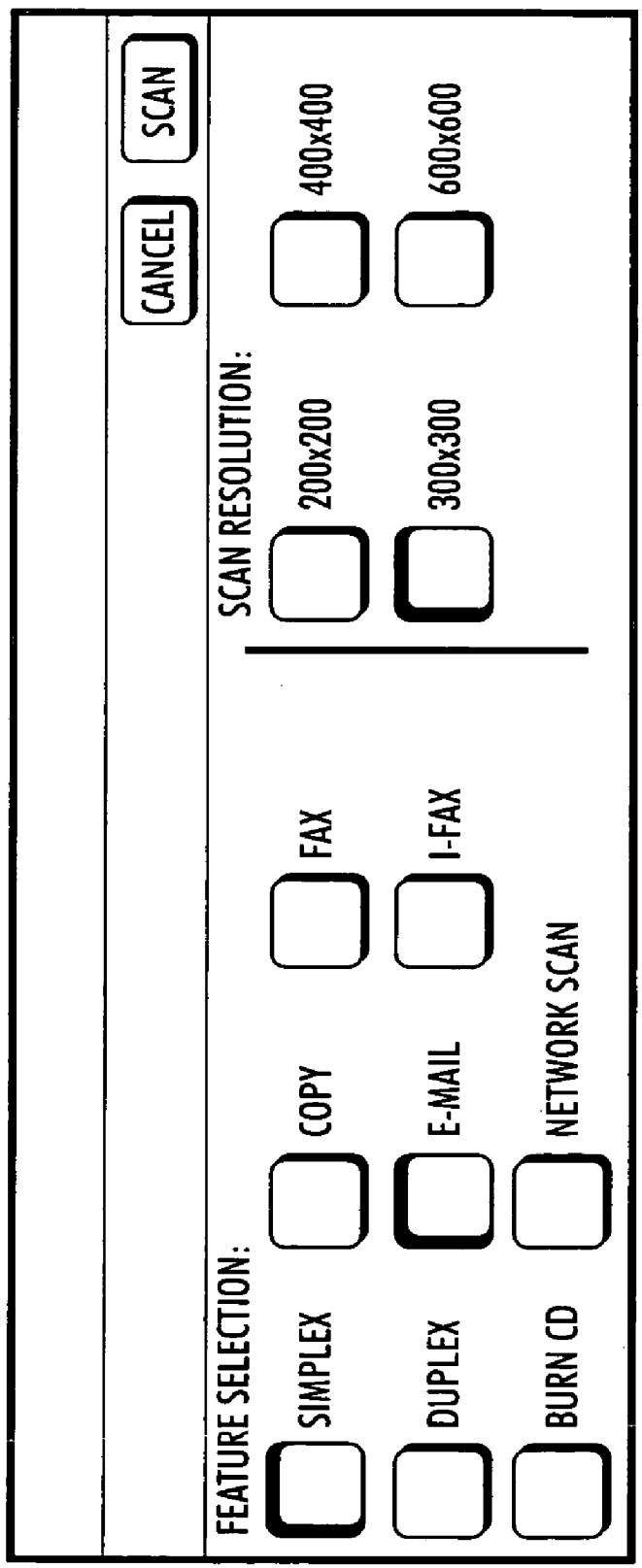
FIG. 3 is an example of a "wizard screen" described with regard to FIG. 2.

FIG. 3 is an example of a "wizard screen" described above with regard to FIG. 2. The wizard screen can be defined as a selection of basic commands, at least some of which commands are suitable for leading to detailed selections of subsequently-displayed screens on UI 20. As shown, these basic commands include simplex or duplex (whether the document requires scanning both sides of each sheet); copy, e-mail, fax, I-fax, network scan, or burn CD. Also shown on the wizard screen is a selection of resolutions for the scanning operation: certain operations, such as facsimile, often work better at relatively low resolutions. A default resolution can be determined, or different defaults can be programmed in response to selection of basic features (e.g., copying at high resolution, facsimile at low resolution). Depending on a particular implementation, a wizard screen could be made very basic, such as including only a "simple/duplex" selection, where the user indicates only if the original document is one- or two-sided.

The wizard screen of FIG. 3 can be displayed effectively at all times when the MFD 10 is on, or can be displayed upon detection of sheets by detector 13, or by detection of the lifting of the documents handler 12 to expose a stationary platen (not shown). As used herein, any such detection shall be considered broadly as "the document being positioned in a predetermined manner relative to the input scanner."

Figure 4:
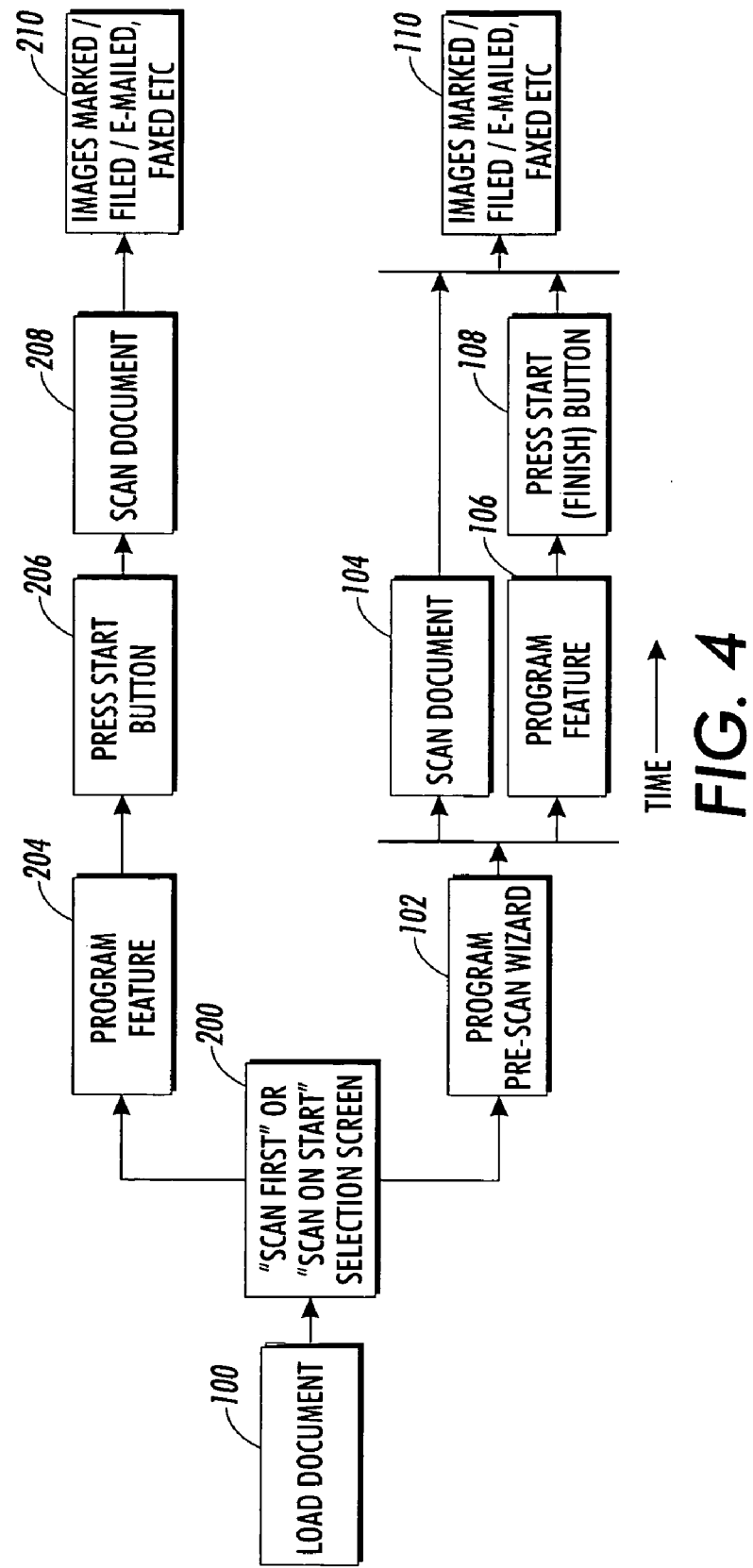
FIG. 4 is a diagram of an alternative workflow.

FIG. 4 is a diagram of an alternative workflow. In FIGS. 2 and 4, like numerals indicate like steps. Following the loading of an original document (step 100), the workflow in FIG. 4 displays a first basic selection on UI 20: "scan first" or "scan on start". If the user selects "scan on start", the wizard screen is displayed and the workflow continues in the same manner as described in FIG. 2. If the user selects "scan on start", the UI displays a set of screen for a particular feature (step 204); after the user make selections, the user hits a START button (or equivalent) (step 206), and as a result the document is scanned (step 208) and the instructions are applied to the recorded images (step 210).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of operating a multifunction office apparatus, the apparatus including a user interface, an input scanner, and at least one of a printer, finisher, disc recorder, facsimile transmitter, network transmitter, or electronic mail transmitter, comprising:
   receiving a document in a document handler;
   feeding the document through the document handler;
   recording images from the document as image data in a memory;
   displaying selections to a user through the user interface during the recording of the images that enable the user to provide instructions to apply the image data to at least one of the printer, the finisher, the disc recorder, the facsimile transmitter, the network transmitter, and the electronic mail transmitter;
   receiving the user's instructions; and
   applying the image data in accordance with the user's instructions.

2. The method of claim 1, further comprising accepting through the user interface an instruction that the instructions are concluded.

3. The method of claim 1, further comprising
   displaying at the user interface a wizard screen, the wizard screen comprising a selection of simplex or duplex input scanning.

4. The method of claim 3, the displaying occurring as a result of the document being positioned in a predetermined manner relative to the input scanner.

5. The method of claim 3, the wizard screen further displaying a selection of simple instructions.

6. The method of claim 3, the wizard screen further displaying a selection of input scanning resolutions.

7. The method of claim 6, further comprising
   in response to accepting a simple instruction through the wizard screen, recording the image at predetermined default resolution.

8. The method of claim 3, further comprising
   as a result of one of accepting a selection from the wizard screen and the document being positioned in a predetermined manner relative to the input scanner, displaying at the user interface a detailed selection screen.

9. The method of claim 1, further comprising
   displaying a selection of whether the recording is to occur during the accepting of instructions, or after the accepting of instructions.

10. A multifunction office apparatus, the apparatus including a user interface, an input scanner, and at least one of a printer, finisher, disc recorder, facsimile transmitter, network transmitter, or electronic mail transmitter, comprising:
   a memory that stores image data;
   a document handler that receives and feeds a document placed therein by a user;
   an image recorder that records images from the document as image data in the memory;
   a user interface that displays selections to the user during the recording of the images that enable the user to provide instructions to apply the image data to at least one of the printer, the finisher, the disc recorder, the facsimile transmitter, the network transmitter, and the electronic mail transmitter, wherein the user interface receives the user's instructions and applies the image data in accordance with the user's instructions.

11. The multifunction office apparatus of claim 10, wherein the user interface displays a selection of whether the recording is to occur during the accepting of instructions, or after the accepting of instructions.

12. The multifunction office apparatus of claim 10, wherein the user interface displays the selections as a result of the document being positioned in the document handler.

13. The multifunction office apparatus of claim 10, wherein in response to accepting a simple instruction through the user interface, the image recorder records the images at predetermined default resolution.

14. The multifunction office apparatus of claim 10, wherein as a result of one of the user accepting a selection from the user interface and the document being positioned in a the document handler, the user interface display a detailed selection screen.

* * * * *